United States Patent [19]

Saito et al.

[11] Patent Number: 4,908,636

[45] Date of Patent: Mar. 13, 1990

[54] RECOVERY DEVICE HAVING A PROTRUDING PORTION PROVIDING REDUCED PRESSURE FOR IMPROVED RECOVERY AND METHOD USING SAME

[75] Inventors: Atsushi Saito, Yokohama; Yutaka Koizumi, Tokyo; Toshihiro Mori; Minoru Nozawa, both of Hiratsuka, all of Japan

[73] Assignee: Canon Kabushiki Kaisha, Tokyo, Japan

[21] Appl. No.: 171,462

[22] Filed: Mar. 21, 1988

[30] Foreign Application Priority Data

Mar. 31, 1987 [JP] Japan ................................ 62-76353

[51] Int. Cl.[4] .......................... G01D 15/16; B41J 3/04

[52] U.S. Cl. .................................. 346/140 R; 346/1.1

[58] Field of Search ................................ 346/140, 1.1

[56] References Cited

U.S. PATENT DOCUMENTS 4,276,554 6/1981 Terasawa .
4,306,245 12/1981 Kasugayama et al. .
4,394,669 7/1983 Ozawa et al. .
4,410,900 10/1983 Terasawa .
4,411,706 10/1983 Wallace ........................ 346/140 X
4,590,494 5/1986 Ichihashi et al. .
4,600,931 7/1986 Terasawa .
4,701,771 10/1987 Ikeda .

FOREIGN PATENT DOCUMENTS 133335 10/1979 Japan .
173670 10/1983 Japan .

*Primary Examiner*—Joseph W. Hartary
*Attorney, Agent, or Firm*—Fitzpatrick, Cella, Harper & Scinto

[57] ABSTRACT

A liquid jet recording apparatus includes a cap member for covering discharge ports of a liquid jet recording head which discharge recording liquid. The cap member is provided with a protruding portion opposed to the discharge ports. Gas flow is generated in a space formed by the cap member and the liquid jet recording head. The protruding portion provides for a negative or reduced pressure at the discharge ports, to draw off impurities and improve recovery. An improved recovery method is also provided.

22 Claims, 4 Drawing Sheets

RECOVERY DEVICE HAVING A PROTRUDING PORTION PROVIDING REDUCED PRESSURE FOR IMPROVED RECOVERY AND METHOD USING SAME

BACKGROUND OF THE INVENTION

1. Field of the Invention

The present invention relates to a liquid jet recording apparatus, and more particularly to a liquid jet recording apparatus equipped with a recovery device for resolving so-called clogging of the recording head, and a method of recovery.

2. Related Background Art

In a liquid jet recording head in which recording liquid is emitted as a flying droplet from a small discharge port, there may result failure of the liquid emission or distorted flight of liquid droplet due to the trapping of bubbles in a liquid path connected to the discharge port or in a liquid chamber connected to the liquid path, or coagulation of dust or recording liquid around the discharge port, or an increase in the viscosity of the recording liquid. In order to prevent such phenomena, and for the initial filling of recording liquid into the liquid path, a so-called recovery operation has been conducted, for example, after a prolonged interruption of the recording operation.

For conducting such recovery operation there are already known certain devices, such a as the one for covering a discharge port surface of the recording head in which discharge ports are formed with a cap member and sucking the internal space under the cap member with a pump and others to extract the recording liquid through the discharge ports by the generated negative pressure together with the dust and bubbles therein as disclosed for example, in U.S. Pat. Nos. 4,276,554, 4,410,900, 4,600,931, 4,394,669 or the one for forcedly expelling the recording liquid through the discharge ports together with the dust and bubbles therein by means of a pump provided in the liquid supply system to the recording head, as disclosed, for example, in U.S. Pat. Nos. 4,276,554 and 4,590,494.

However, though such conventional devices are capable of filling the recording head with new recording liquid and removing the dust and bubbles from the head by sucking or expelling the recording liquid from the recording head, it is difficult to completely eliminate the recording liquid deposited in the vicinity of discharge ports on the discharge port surface. Such deposited recording liquid bends the flight of the liquid droplet toward the recording liquid, thus deteriorating the image quality of the recording. Also, a careless recovery operation may cause deposition of the extracted liquid in the vicinity of the discharge ports, thus resulting in a problem the same as the remaining recording liquid. For removing such liquid it has been proposed to use a mechanism for wiping off the sticking liquid in addition to the recovery device, as disclosed in U.S. Pat. No. 4,306,245, but such method requires a complicated structure and the recovery device, requiring a pump, cannot be simplified much.

SUMMARY OF THE INVENTION

In consideration of the foregoing, an object of the present invention is to provide a recovery device for use in a liquid jet recording head, capable of removal of bubbles and dust in the recording head and filling of new recording liquid therein, and in addition, simultaneous removal of recording liquid and dust deposited around discharge ports, with a simple structure.

Another object of the present invention is to provide a liquid jet recording apparatus which is featured by having a cap member for covering discharge ports for liquid emission of a liquid jet recording head; and means for causing an air flow in a space formed by said cap member and said liquid jet recording head; wherein said cap member is provided with a protruding portion in a position opposite to said discharge ports.

Still another object of the present invention is to provide a liquid jet recording apparatus equipped with a liquid jet recording head having discharge ports for emitting recording liquid and a cap member for covering said discharge ports wherein said cap member is provided, on the internal face thereof, with a protruding portion in a position opposed to said discharge ports and further comprising means for causing an air flow in a space formed by said liquid jet recording head and the internal face of said cap member.

Still another object of the present invention is to provide a recovery method for a liquid jet recording apparatus, featured by causing an air flow, in a state in which a face having discharge ports for emitting recording liquid of a liquid jet recording head is covered by a cap member having a protruding portion in a position opposed to said discharge ports in a space formed by said recording head and said cap member through a gap formed by said protruding portion and said recording head.

DETAILED DESCRIPTION OF THE PREFERRED EMBODIMENTS

Briefly, the liquid jet recording apparatus of the present invention is featured, when a recording head is covered by a cap member, by causing air flow in a space formed by the recording head and the cap member to thereby remove unnecessary recording liquid deposited on the discharge port surface, and utilizing a Venturi effect for generating a particularly effective air flow.

In such a liquid jet recording apparatus of the present invention, a protruding wall of the cap member forms a Venturi tube structure in cooperation with a front face of the discharge ports of the discharge port surface and, when a high-speed gas flow is introduced therein or when a high speed gas or liquid passes therethrough, a negative pressure is induced to extract the recording liquid from the discharge ports together with the bubbles. The extracted liquid is blown off together with the dust by the high-speed air flow from the area of the discharge ports and is removed from the cap member, for collection, for example, in a used liquid reservoir. In this manner the recovery operation can be achieved simultaneously with cleaning around the orifices, thus contributing to maintaining of high image quality. As explained above, the Venturi effect is effectively utilized in the present invention to securely achieve the recovery operation with a simple structure.

Now the present invention will be clarified in detail by embodiments thereof shown in the attached drawings.

Figure 1A:
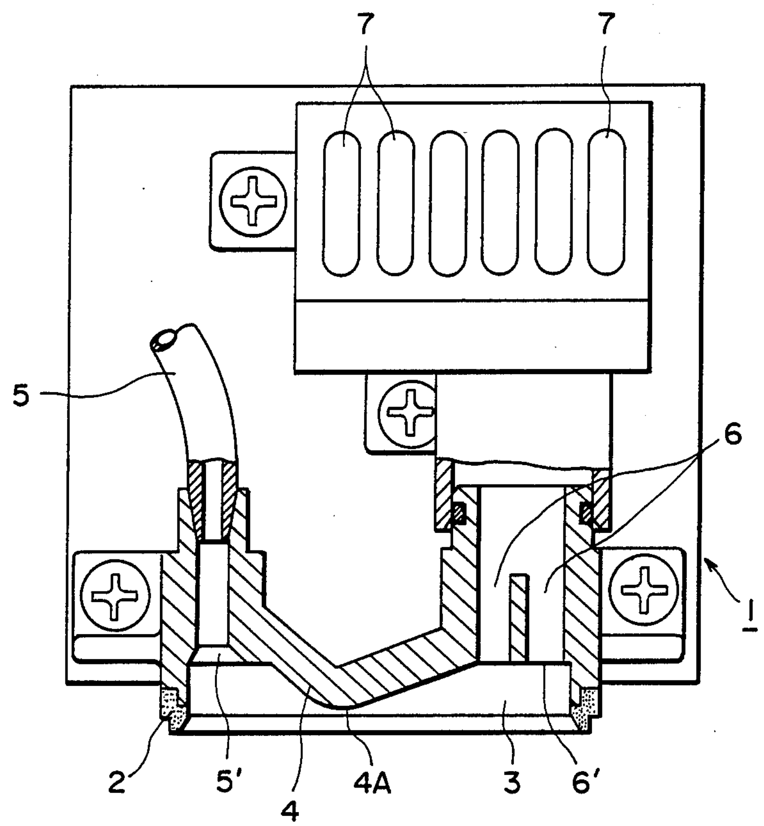
FIGS. 1A, 1B and 1C are respectively a partially cut-off plan view, an elevation view and a partially cut-off lateral view schematically showing an embodiment of the cap member of the present invention.
Figure 1B:
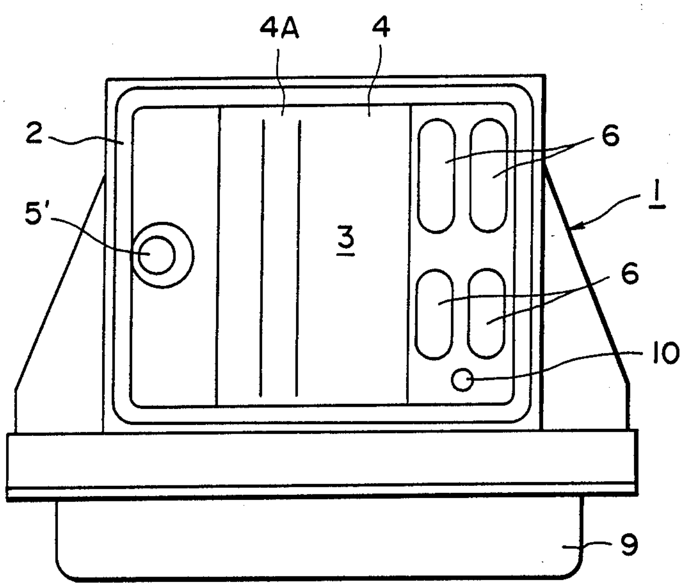
Figure 1C:
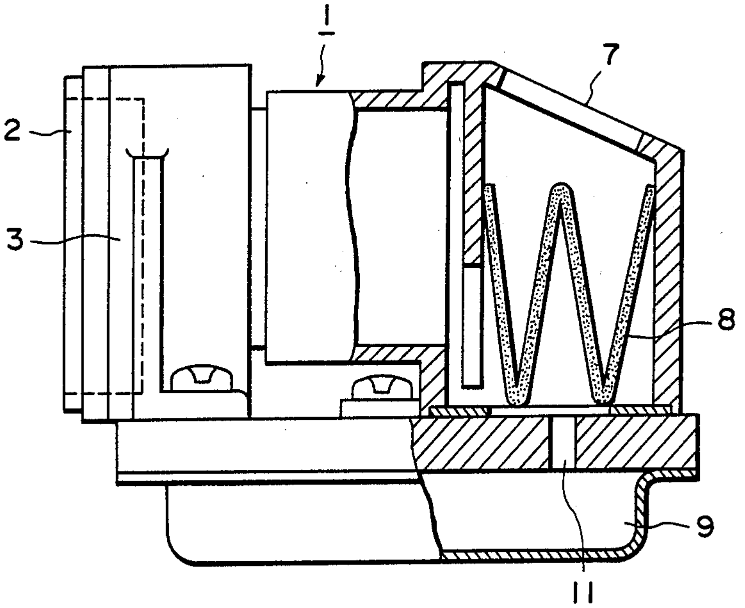

FIGS. 1A to 1C illustrate an embodiment of the cap member of the present invention, wherein a cap member 1 is provided with a seal member 2, composed of an elastic material such as rubber, on the periphery thereof at a side facing the recording head (not shown), thereby defining a space 3 therein. A wall 4 protruding along the vertical direction as shown in FIGS. 1A and 1B is positioned opposite to said recording head in the space 3; so that a Venturi tube structure is formed between the protruding portion 4A of the wall 4 and the discharge port surface when the cap member 1 is set on the discharge port surface as will be explained later.

There are also shown an aperture 5' to which is connected a supply tube 5 for supplying pressurized air from a side of the space 3; an aperture 6' communicating with a drain path 6 for discharging air from the other side of the space 3; and an exhaust hole 7 for discharging the air from the drain path 6 outside of the cap member through a filter 8. Below the drain path 6 and the filter 8 there are provided used liquid paths 10, 11 for guiding the recording liquid extracted from the recording head, into a used liquid tank 9 constituting used liquid disposal means. In the used liquid tank there may be provided a porous material, or, if a sufficient absorbing ability is obtained, said porous material alone may be employed without the tank.

Figure 2:
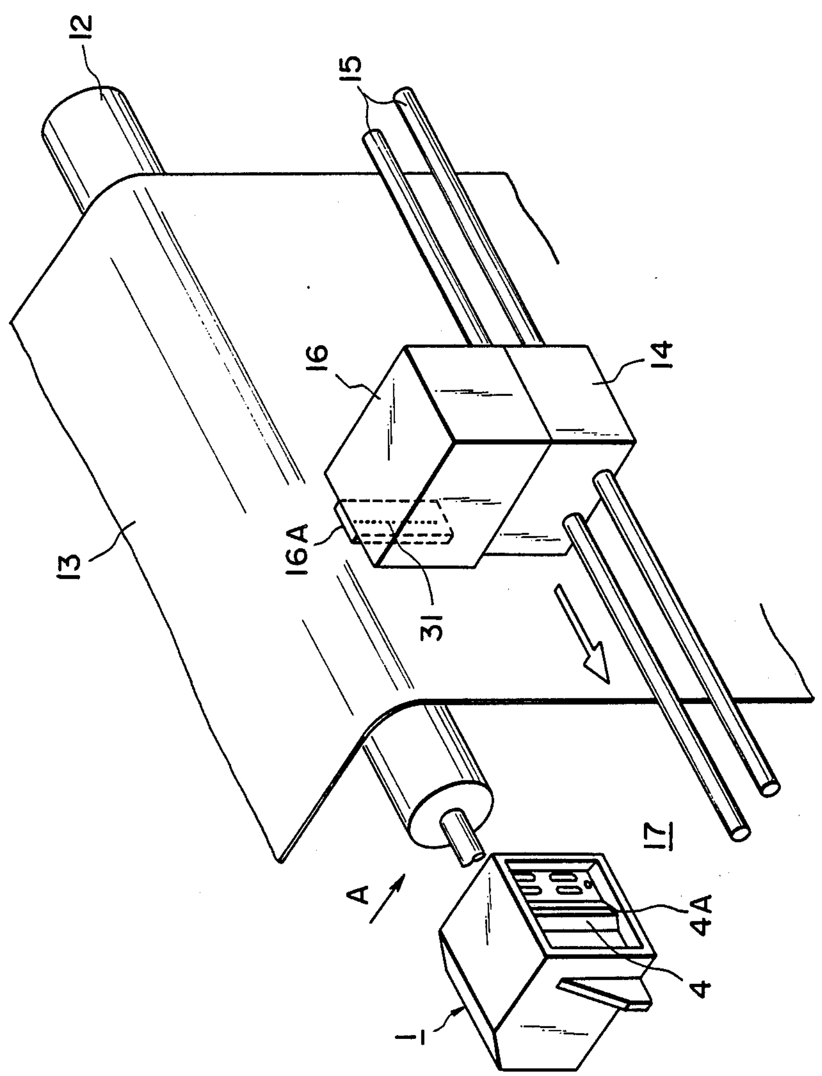
FIG. 2 is a schematic perspective view of an embodiment of a recording apparatus of the present invention.

FIG. 2 shows the arrangement of the cap member 1 shown in FIGS. 1A to 1C. A roller 12 is provided for advancing a recording sheet 13, which is maintained flat by a platen positioned behind said sheet. A carriage 14 is slidably supported by a guide shaft 15 and is driven along the recording sheet 13 by driving means (not shown) and a recording head 16 is mounted on said carriage 14. When the carriage 14 is moved in a direction indicated by the arrow to a home position 17 at the left-hand end, for example, as shown in the drawing, the cap member 1 is moved in a direction A to cover a discharge port surface 16a of the recording head 16 in an air-tight manner.

Figure 3:
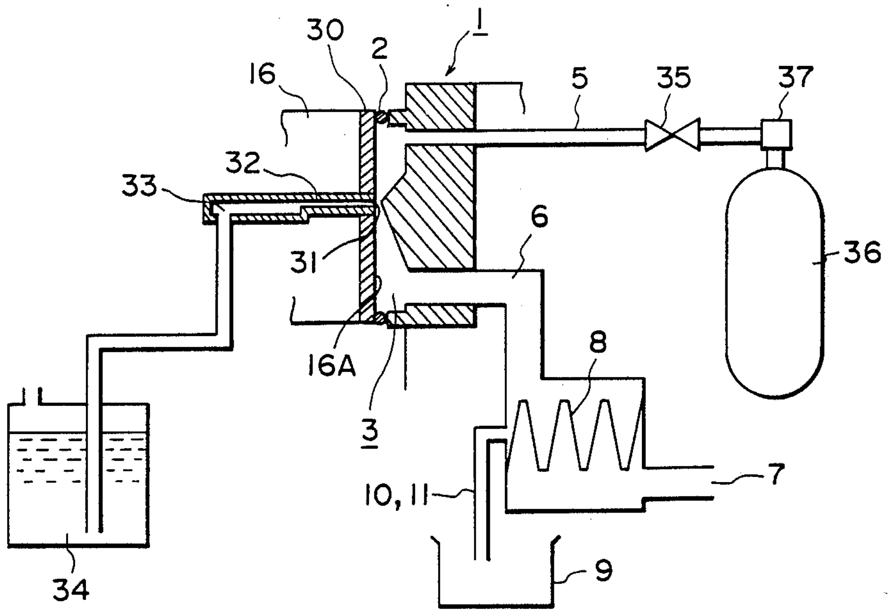
FIG. 3 is a schematic diagram showing an embodiment of a liquid jet recording apparatus of the present invention.

FIG. 3 shows a state in which the discharge port surface of the recording head 16 is covered by the cap member 1 in an air-tight manner. In FIG. 3 there are shown a front plate 30 of the recording head 16, an orifice 31 formed on the surface 16A of the head for emitting the liquid supplied from a liquid path 32; a common liquid chamber 33; and a tank 34 for supplying recording liquid. In the present embodiment, the supply tube 5 of the cap member 1 is connected to a gas container 36 for generating a gas flow through a supply valve 35. The gas container 36 is a disposable or rechargeable container filled with non-inflammable gas or pressurized air and is detachably connected at the connector 37.

In such a liquid jet recording apparatus, the carriage 14 is driven to move the recording head 16 to the home position, then the discharge port surface 16A of said recording head 16 is covered by the cap member 1, and the supply valve 35 of the container 35 is opened, whereby the pressurized air, for example, supplied through the supply pipe 5 passes through a Venturi tube portion 40 formed by the surface 16A and the protruding portion 4A of the wall 4 and is discharged from the exhaust hole 7 at the other side.

Figure 4:
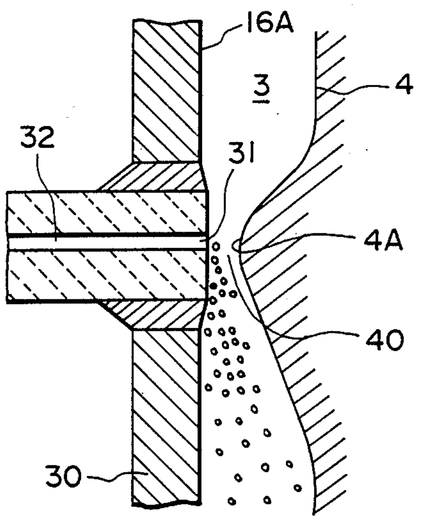
FIG. 4 is a schematic view showing the principle of recovery operation.

In the Venturi tube portion 40 there is obtained a high-speed air flow as shown in FIG. 4. A negative pressure thus generated extracts the recording liquid from the liquid path 32 through the orifice 31, together with the dust and bubbles present in the liquid path 32. Simultaneously, the liquid and dust eventually sticking on the surface 16A in the vicinity of the orifice are blown off. In this manner, the function of recovery operation can be completely achieved.

In the foregoing description, the pressurized air is obtained from a disposable or rechargeable gas container. However, for example in a recording apparatus in which the recording sheet is held on a platen by air suction from the rear side of the platen, the suction pump therefor may be utilized for generating the air flow. Also it is naturally possible to use a separate small air compressor or air feeding means of a capacity enough for generating the required air flow.

As explained in the foregoing, the present invention, in which the cap member is provided with a protruding portion in a position opposed to the discharge port surface to form a Venturi tube structure in cooperation with the discharge port surface of the recording head, allows extraction of the recording liquid from the surface and to remove the recording liquid from the surface in the vicinity of the discharge ports, thereby dispensing with a separate mechanism for removing the recording liquid sticking around the discharge ports in case of conventional recovery operation for only extracting the recording liquid from the discharge ports, thus simplifying the structure and contributing to the improvement of image quality.

What is claimed is:

1. A liquid jet recording apparatus including a liquid jet recording head having discharge ports for discharging recording liquid, said recording apparatus comprising:

a cap member for covering the discharge ports, the cap member being provided with a protruding portion opposed to the discharge ports; and means for generating a gas flow passed said protruding portion in a space formed by said cap member and the liquid jet recording head to create a reduced pressure for removing impurities from the discharge ports.

2. A liquid jet recording apparatus according to claim 1, wherein said gas flow generating means comprises pump means.

3. A liquid jet recording apparatus having an ink jet recording head provided with discharge ports for discharging recording liquid, said recording apparatus comprising:

a cap member having an internal face for covering the discharge ports, the internal face having a protruding portion opposed to the discharge ports; and means for generating a gas flow in a space formed by the internal face of said cap member and the liquid jet recording head;

wherein the protruding portion creates a reduced pressure in the gas flow for removing impurities from the discharge ports.

4. A liquid jet recording apparatus according to claim 3, further including apertures provided on said cap member positioned on both sides of the protruding portion, one of said apertures being connected to said gas flow generating means.

5. A liquid jet recording apparatus according to claim 3, wherein said gas flow generating means comprises a container filled with pressurized gas.

6. A liquid jet recording apparatus according to claim 5, wherein said gas comprises at least one of air and noninflammable gas.

7. A liquid jet recording apparatus according to claim 3, wherein said gas flow generating means comprises at least one of pump means and air blower means.

8. A liquid jet recording apparatus according to claim 4, further including used liquid disposal means to which another of said apertures is connected.

9. A liquid jet recording apparatus according to claim 8, wherein said used liquid disposal means comprises a used liquid tank.

10. A liquid jet recording apparatus according to claim 8, wherein said used liquid disposal means comprises a porous absorbent material.

11. A liquid jet recording apparatus according to claim 4, further including a filter through which another of said apertures communicates to atmosphere.

12. A liquid jet recording apparatus according to claim 4, further including communicating means for communicating a second of said apertures to atmosphere through a filter and further including communicating means for communicating the second of said apertures to used liquid disposal means without the filter.

13. A liquid jet recording apparatus according to claim 3, further including a seal member in a portion in contact between said cap member and the liquid jet recording head.

14. A liquid jet recording apparatus according to claim 4, wherein said aperture connected to said gas flow generating means is smaller in area than the one aperture.

15. A liquid jet recording apparatus according to claim 13, wherein said seal member comprises an elastic member.

16. A liquid jet recording apparatus according to claim 3, wherein said gas flow generating means comprises a container filled with pressurized gas and further includes a supply valve connecting said gas flow generating means to said cap member.

17. A liquid jet recording apparatus according to claim 5, further including means for interchanging said container.

18. A recovery method for a liquid jet recording apparatus including a liquid jet recording head having discharge ports for discharging recording liquid, said recovery method comprising:

covering the discharge ports by a cap member having a protruding portion opposed to the discharge ports; and generating a gas flow in a space formed by the recording head and the cap member, through a gap formed by the protruding portion and the recording head to create a reduced pressure for removing impurities from the discharge ports.

19. A recovery method according to claim 18, further including generating the gas flow from a container filled with pressurized gas.

20. A recovery method according to claim 19, further including selecting the gas from air and non-inflammable gas.

21. A recovery method according to claim 19, further including interchangeably connecting the gas container.

22. A recovery method according to claim 18, further including generating the gas flow by at least one of a pump and an air blower means.

* * * * *